(12) United States Patent
Ziegler et al.

(10) Patent No.: US 6,973,075 B1
(45) Date of Patent: Dec. 6, 2005

(54) COMPUTER PROGRAM AND METHOD FOR MODIFYING DATA TABLES IN A TELECOMMUNICATIONS SWITCH

(75) Inventors: Bruce Edward Ziegler, Olathe, KS (US); Daniel Christopher Wieschhaus, Shawnee, KS (US); Anthony Earl Johnson, Grandview, MO (US); Igor Mikhailovich Dvoeglazov, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 747 days.

(21) Appl. No.: 09/678,013

(22) Filed: Oct. 3, 2000

(51) Int. Cl.[7] .............................................. H04L 12/66
(52) U.S. Cl. ........................ 370/356; 370/360; 709/219
(58) Field of Search ............................... 370/389, 356, 370/360, 901; 379/900; 707/1, 100, 102, 707/104.1; 709/223, 230, 217, 219, 220

(56) References Cited

U.S. PATENT DOCUMENTS

| | | | | |
|---|---|---|---|---|
| 5,963,939 A | * | 10/1999 | McCann et al. | 707/4 |
| 6,119,165 A | * | 9/2000 | Li et al. | 709/229 |
| 6,269,398 B1 | * | 7/2001 | Leong et al. | 709/224 |
| 6,308,220 B1 | * | 10/2001 | Mathur | 709/238 |
| 6,438,110 B1 | * | 8/2002 | Rai et al. | 370/254 |
| 6,584,189 B1 | * | 6/2003 | Hansen et al. | 379/221.02 |
| 6,628,644 B1 | * | 9/2003 | Nelson et al. | 370/352 |
| 6,687,251 B1 | * | 2/2004 | Mousseau et al. | 370/401 |
| 2002/0033844 A1 | * | 3/2002 | Levy et al. | 345/744 |
| 2002/0194081 A1 | * | 12/2002 | Perkowski | 705/26 |
| 2003/0055962 A1 | * | 3/2003 | Freund et al. | 709/225 |
| 2003/0237016 A1 | * | 12/2003 | Johnson et al. | 714/4 |

* cited by examiner

*Primary Examiner*—Chau Nguyen
*Assistant Examiner*—Joshua Kading

(57) ABSTRACT

A computer program and method that allows direct access and modification of the data tables (12) in voice-over-i.p. local routing switches (10) so that administrators can more easily modify data and/or supplement data therein. The method and computer program permits an administrator to view a list of voice-over-i.p. local routing switches; select a switch from the list; view a list of data tables for the selected switch; select a data table from the list; search for and retrieve information in the data table; modify the information; and then upload the modifications to the switch by sending the modifications to an interface on the switch.

18 Claims, 8 Drawing Sheets

Fig. 7

COMPUTER PROGRAM AND METHOD FOR MODIFYING DATA TABLES IN A TELECOMMUNICATIONS SWITCH

MICROFICHE SOURCE CODE APPENDIX

A Microfiche Appendix containing source code of computer programs of the present invention is appended hereto as 5 sheets of microfiche containing a total of 306 frames and is hereby incorporated by reference into this application as if fully set forth herein.

BACKGROUND OF THE INVENTION

1. Field of the Invention

The present invention relates to telecommunications switches. More particularly, the invention relates to a computer program and method for modifying data tables in voice-over-i.p. local routing switches.

2. Description of the Prior Art

Telecommunications companies are beginning to offer broadband home and business communications systems that integrate a number of communications services in one package. For example, Sprint Communications Company, L.P. has recently introduced its ION broadband communications service that carries voice, data, and video over one connection. The service permits subscribers to make telephone calls, send and receive faxes, and use the Internet simultaneously.

To integrate voice and data over the same connection, broadband services require the use of voice-over-i.p. (Internet protocol) local routing switches for the voice component of the services. Two examples of voice-over-i.p. local routing switches are the GTE Service Manager Switch and the Telcordia Service Gateway Service Manager Switch.

Voice-over-i.p. local routing switches typically support a number of data tables that include customer information, routing data, and network architecture information. Because broadband communications services are relatively new and rapidly growing, the information in these data tables must be frequently supplemented, edited, otherwise modified. Unfortunately, no interfaces currently exist that permit an administrator such as a translations specialist to directly access and modify the tables in a voice-over-i.p. local routing switch. Telcordia has an interface for its Service Manager Switch that permits an administrator to manipulate data at a service level, but the interface does not permit direct access to information in data tables. This is a disadvantage because, without direct access to the data tables in a voice-over-i.p. local routing switch, it is difficult and time-consuming to load large amounts of incremental updates. Moreover, if an administrator wishes to add a new service using the Telcordia interface, the administrator first needs to modify the interface to support the new service, a task that requires special programming knowledge of the interface and the switch.

SUMMARY OF THE INVENTION

The present invention solves the above-described problems and provides a distinct advance in the art of interfaces for voice-over-i.p. local routing switches. More particularly, the present invention provides a computer program and method that allows direct access and modification of the data tables in switches so that administrators can more easily edit, supplement, or otherwise modify data therein.

The method and computer program of the present invention permits an administrator to view a list of voice-over-i.p. local routing switches; select a switch from the list; view a list of data tables for the selected switch; select a data table from the list;
    search for and retrieve information in the data table; modify the information; and then upload the modifications to the switch by sending the modifications to an interface on the switch.

The present invention allows manipulation of data at a table level, rather than at a service level. At a table level, an administrator with sufficient understanding of the business logic of a voice-over-i.p. local routing switch can make updates quickly and easily. In addition, the table-level interface of the present invention supports mass loading of data into a switch, which cannot be easily or quickly done at a service level.

With the present invention, an administrator may even add a new service to a switch by simply updating the necessary tables directly, without requiring complicated and time-consuming changes to the interface itself.

The present invention uses a factory server to access data on a voice-over-i.p. local routing switch. An applet sends a logical name based on a server table name to the factory server. The factory server creates a remote object which is used by the applet to obtain an address to a table in the switch. The factory server is a stand-alone component and therefore can be used by any application to create a remote object, including CORBA objects.

The present invention also includes a table wrapper code generator component. Any time a new table is added to a voice-over-i.p. local routing switch, it requires the creation of a view to interpret data and an interface to manipulate the view. The view structure and interface definition language (IDL) structure are passed to the table wrapper code generator, which then creates the code to map the view elements to the IDL elements. The code generator automates what is normally a manual process and therefore improves the accuracy and speed of table additions, particularly when multiple tables are modified.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 7 is a screen shot of one of the screens presented by the computer program of the present invention.

Figure 1:
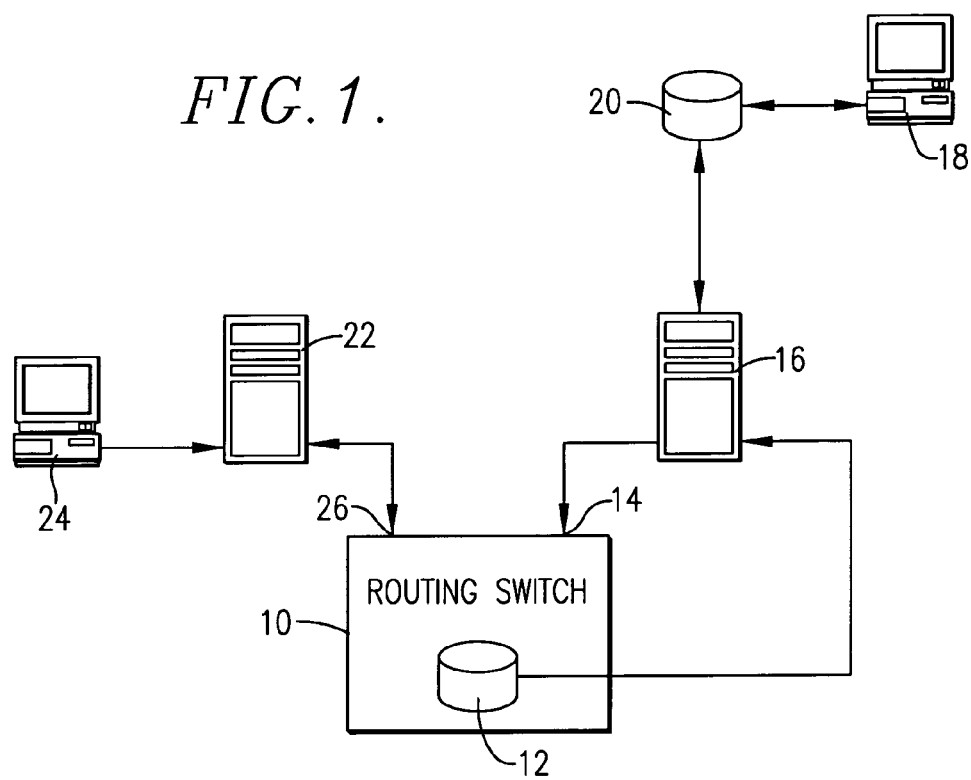
FIG. 1 is a schematic diagram of computer and telecommunications equipment that may be used to implement certain aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

As generally depicted in FIG. 1, the present invention provides an interface to one or more voice-over-i.p. local routing switches 10 (often referred to herein as merely "switch" or "switches") such as the Service Manager Switch manufactured by GTE or the Service Gateway Service Manager Switch manufactured by Telcordia. Each switch includes a plurality of Oracle data tables in a database or file 12 that contain customer information, routing data, network architecture information, and other data. For example, the data tables may include NPA/NXX or originating area information and information on existing trunk groups and trunk circuits. Each switch also includes an IDL interface 14 that permits access to certain information in the data tables and that permits uploading of information to the switch.

The interface of the present invention can be implemented in hardware, software, firmware, or a combination thereof. In a preferred embodiment, however, the interface is implemented with software that operates a server-type computer 16 and one or more user computers 18 coupled with the server computer 16. The software and equipment illustrated and described herein are merely examples of hardware and software that may be used to implement a preferred embodiment of the present invention and may be replaced with other software and computer equipment without departing from the scope of the present invention.

The computer programs of the present invention operate the server computer 16 and the user computers 18 as described herein. The computer programs each preferably comprise an ordered listing of executable instructions for implementing logical functions in the server computer 16, the user computers 18, and the switch 10. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, wireless, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The server computer 16 is programmed to send requests and upload modifications to the switch 10 via the switch's IDL interface 14 and to retrieve information from the Oracle data tables 12 via a similar interface. The server computer 16 may be any conventional computing device such as a Dell 6300 series computer.

The server computer 16 is programmed in accordance with the present invention with a series of HTML pages that may be accessed by one of the user computers 18 with a browser to implement certain steps of the invention. The server computer 16 is also programmed with an applet using, for example, a programming language such as the JAVA™ programming language developed by SUN MICROSYSTEMS™, that is served to the user computers 18 and launched by one or more of the HTML pages to perform certain aspects of the present invention as described below. Inside certain ones of the HTML pages are parameters that drive the behavior of the applet. For example, a parameter may be the location of a local oracle database containing information on several switches. By making this a parameter, the location can be changed without changing the JAVA™ code.

The server computer 16 runs a SQL engine for accessing information in the Oracles data tables 12. The server computer 16 is also programmed with a factory server and a table wrapper code generator as described in more detail below.

The user computers 18 are coupled with the server computer 16 by a communications network such as a local area network (LAN), a wide area network (WAN), an intranet, an extranet, or the Internet. Each user computer 18 permits an administrator, such as a member of a network translations group, to access the server computer 16 to add, delete, supplement, or otherwise modify information in the data tables of the switch 10 as described in more detail below. The user computers 18 may be any conventional computing devices such as personal computers manufactured by Dell.

Certain translation, subscription, and network configuration tasks may also be implemented with a server computer 22 and a user computer 24 that access the Oracle tables 12 through a service delivery platform (SDP) interface 26 of the switch 10 as illustrated in FIG. 1.

The general operation of the present invention is as follows. The applet and the HTML pages on the server computer 16 provide direct access to the Oracle data tables 12 in the switch 10. The applet presents a graphical user interface (GUI) to the user computers 18 that supports the activities required to add, update, delete, or otherwise modify data that is stored in the data tables. An administrator may operate one of the user computers 18 to access the server computer 16 with a browser and launch the HTML pages and the applet. The applet then permits the administrator to view a list of switches, select a switch, select a data table from the switch, search for information in the selected data table, modify the retrieved information, and then upload the changes to the switch.

The applet manages access to the SQL engine to obtain the requested information in the Oracle data tables 12. The applet also preferably performs a security check to ensure that the administrator has read and update authority for the application.

The applet presents the retrieved information in an easy-to-read grid format or database on the screen of one of the user computers 18. The administrator may make changes while on line with the server computer 16 or may save the retrieved information to a file and perform changes to the file. When the administrator has completed making changes and/or modifications, the applet uploads the information to the switch 10 via the switch's IDL interface 14.

Figure 2:
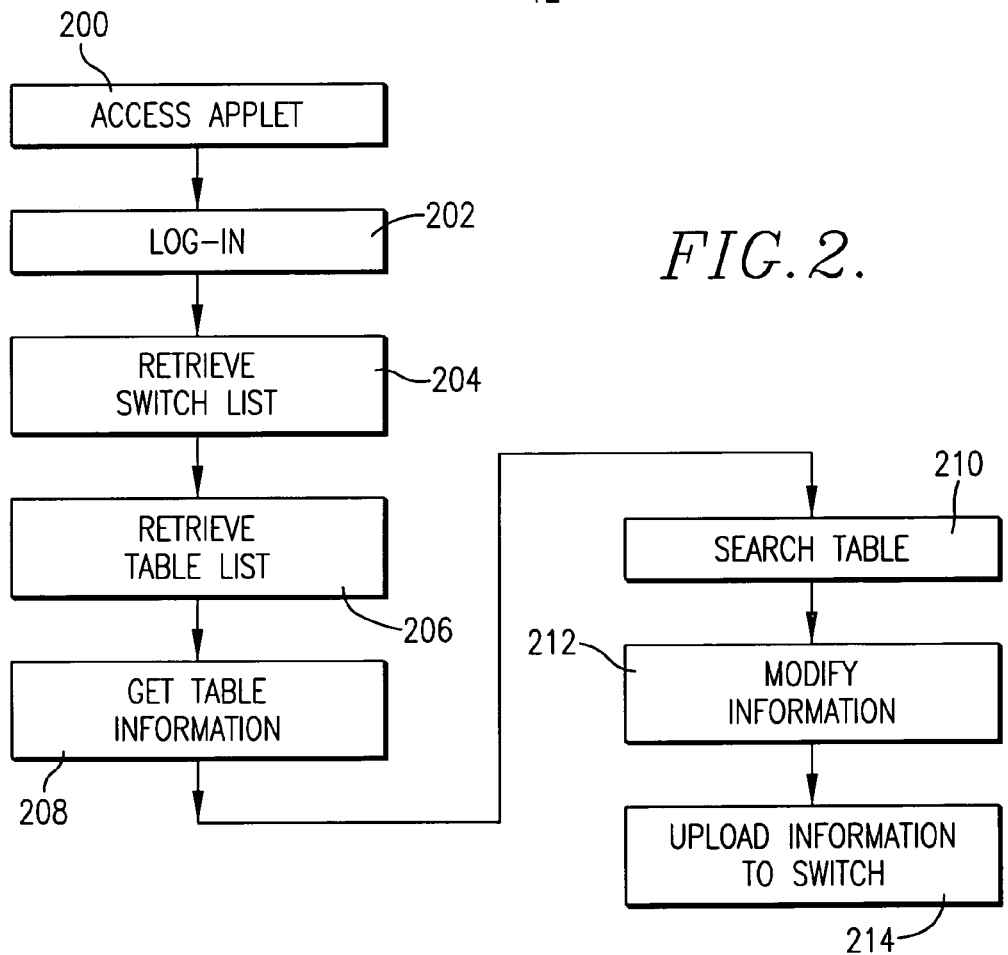
FIG. 2 is a flow diagram broadly depicting certain steps of the present invention.

The flow chart of FIG. 2 shows the functionality and operation of a preferred implementation of the present invention in more detail. In this regard, some of the blocks of the flow chart may represent a module segment or portion of code of the computer programs of the present invention which comprises one or more executable instructions for implementing the specified logical function or functions. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

An administrator first operates a browser on one of the user computers 18 to access the server computer 16 and to open the applet as depicted in box 200. The applet then presents a log-in screen that prompts the administrator to enter a user name and a password as depicted in box 202.

Figure 3:
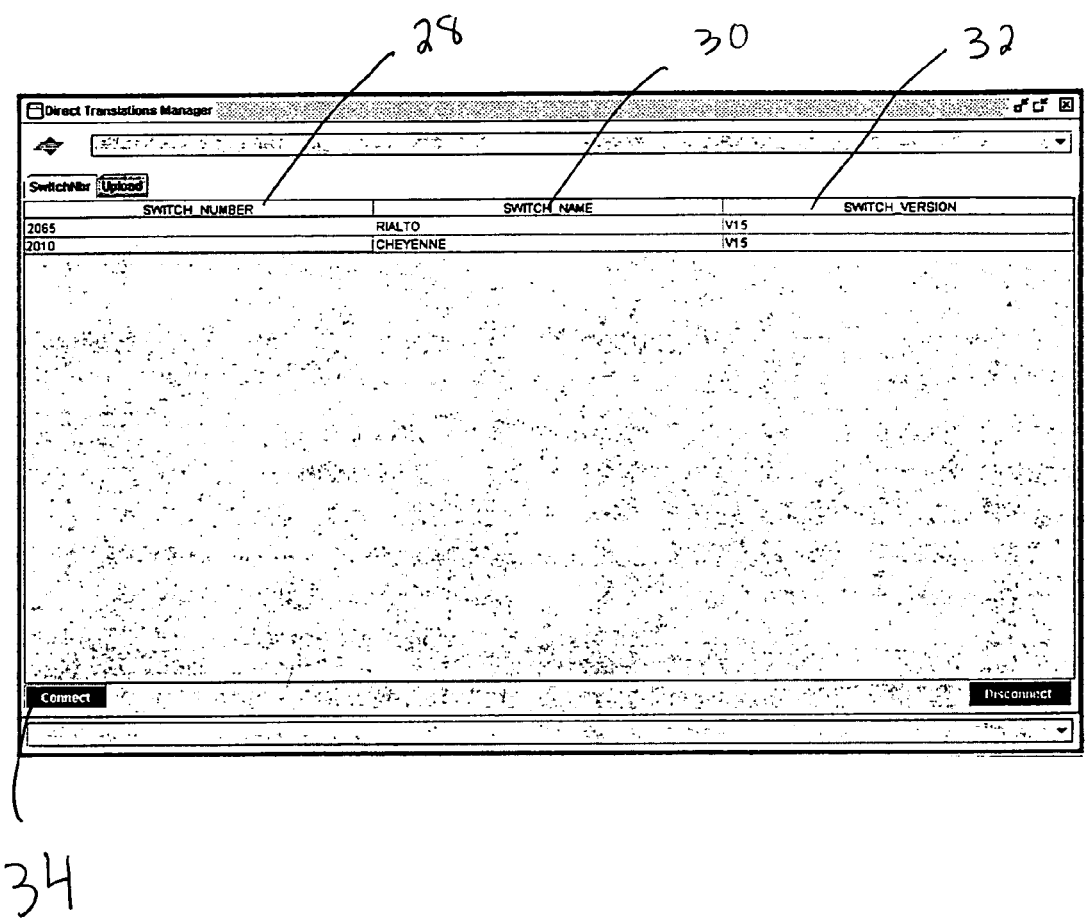
FIG. 3 is a screen shot of one of the screens presented by the computer program of the present invention.

The applet next retrieves and displays a list of voice-over-i.p. local routing switches that may be accessed with the interface as depicted in step 204. The list is displayed on the screen of the user computer 18 in a database or grid such as the one illustrated in FIG. 3. The switch list preferably includes a switch number column 28, a switch name column 30, and a switch version column 32 for indicating the version of software that the switch is currently running. The administrator may highlight and then click on any switch in the list and then activate a Connect button 34 in the lower lefthand corner of the screen.

Figure 4:
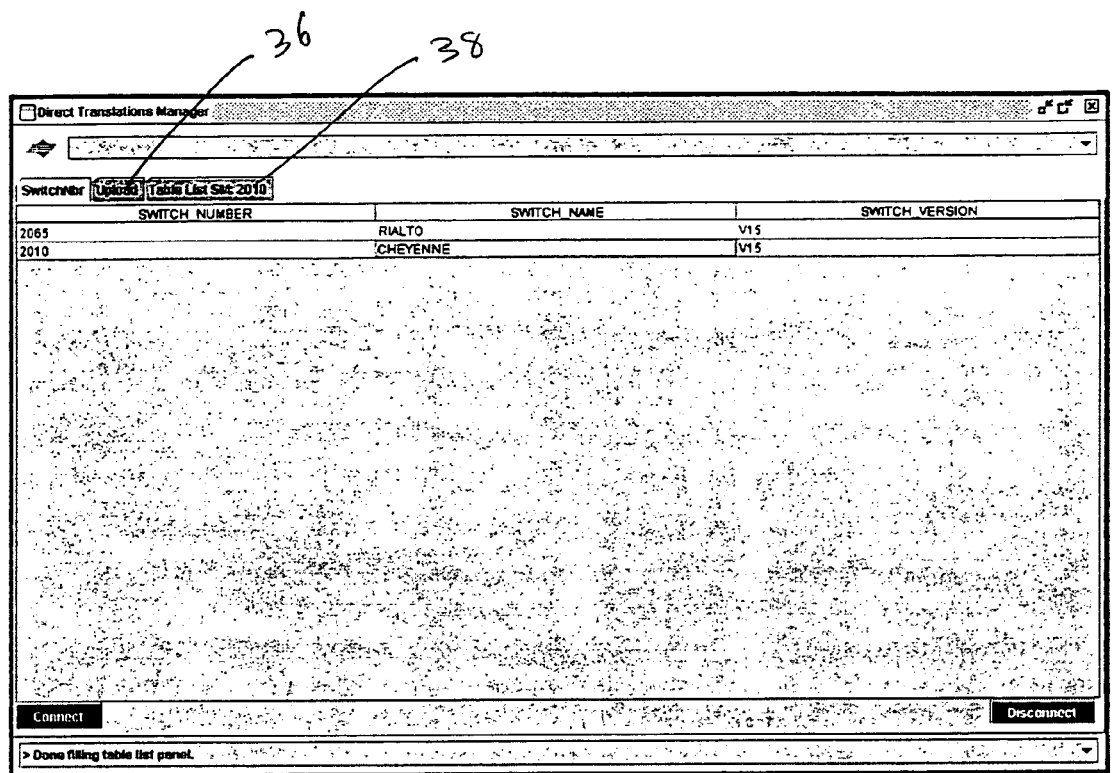
FIG. 4 is a screen shot of one of the screens presented by the computer program of the present invention.
Figure 5:
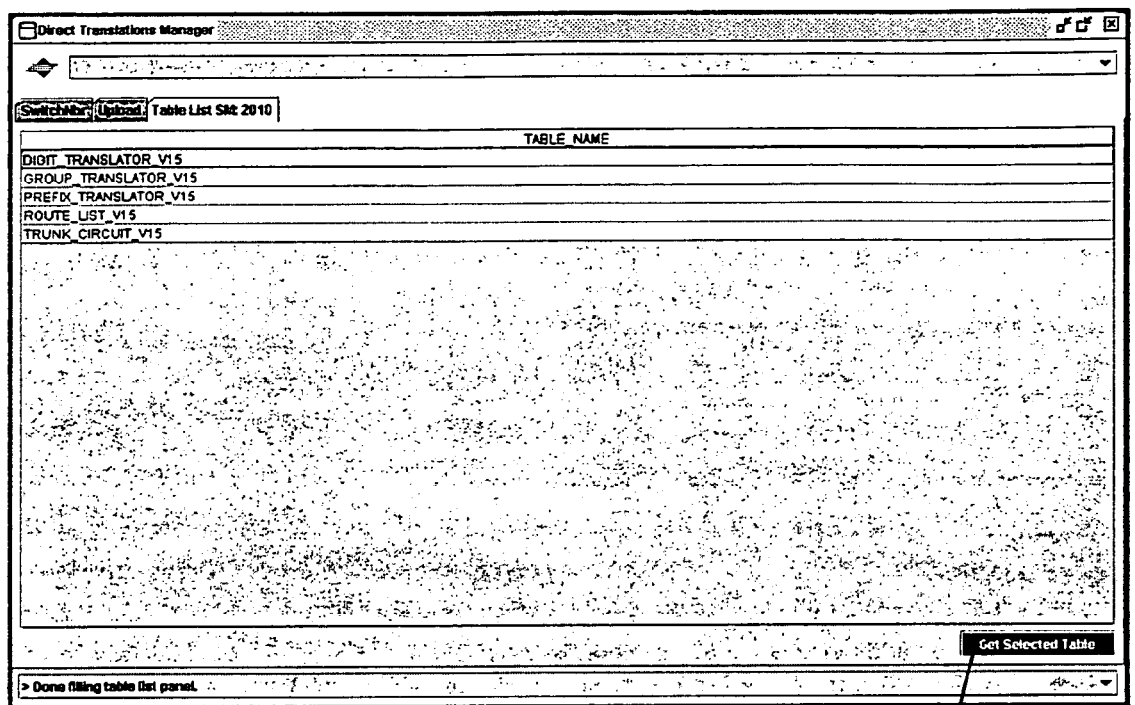
FIG. 5 is a screen shot of one of the screens presented by the computer program of the present invention.
Figure 6:
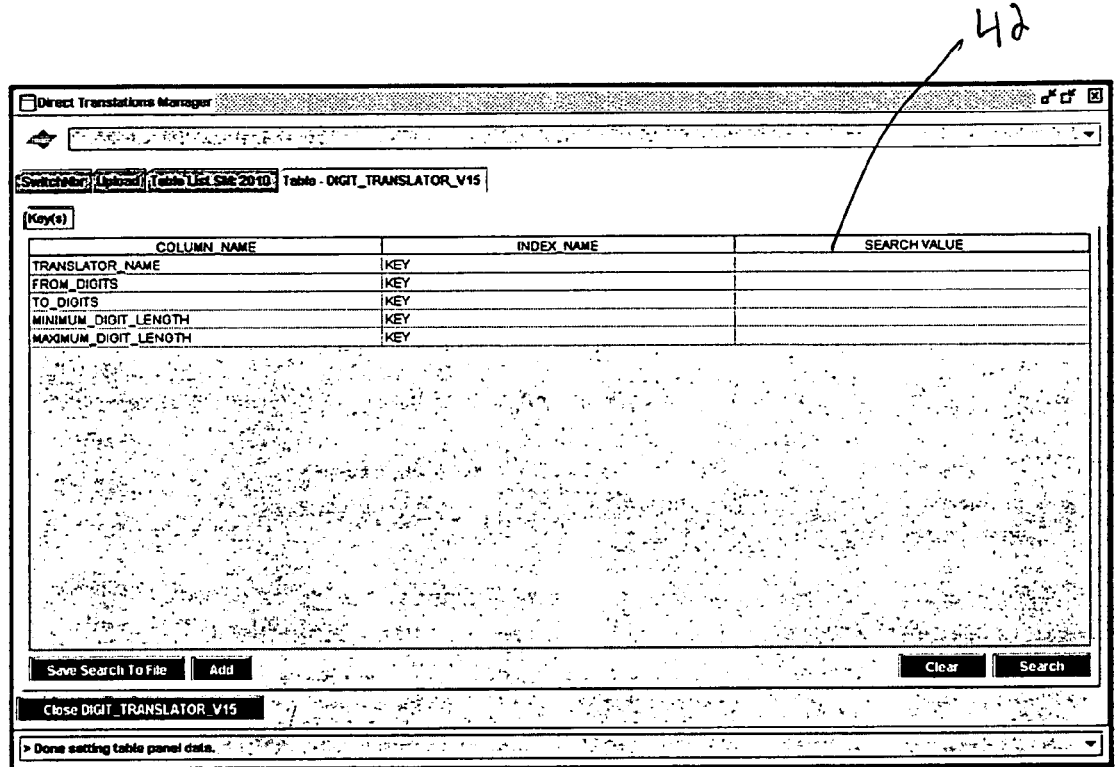
FIG. 6 is a screen shot of one of the screens presented by the computer program of the present invention.

Once the administrator has chosen a switch, the applet presents a screen such as the one illustrated in FIG. 4 that displays an Upload tab 36 that permits the administrator to upload information to the selected switch and a Table List tab 38 that lists all available data tables 12 that may be accessed in the selected switch. If the administrator selects the Table List tab 38, the applet retrieves and displays a screen with a list of all accessible data tables for the selected switch as depicted in box 206 of FIG. 2. An example of the screen is illustrated in FIG. 5. The administrator may then highlight one of the tables and activate a Get Selected Table button 40 to retrieve a "virtual" table of data from the selected data table as depicted in box 208. The applet then displays a screen such as the one illustrated in FIG. 6, which presents a list of key fields for the selected data table and a search column 42 that may be used to search for information or data within the data table as depicted in box 210.

The factory server is used to access data on the switch 10. The applet sends a logical name based on a server table name to the factory server. The factory server creates a remote object which is used by the applet to obtain an address to a table in the switch. The factory server is a stand-alone component and therefore can be used by any application to create a remote object, including CORBA objects.

Figure 7:
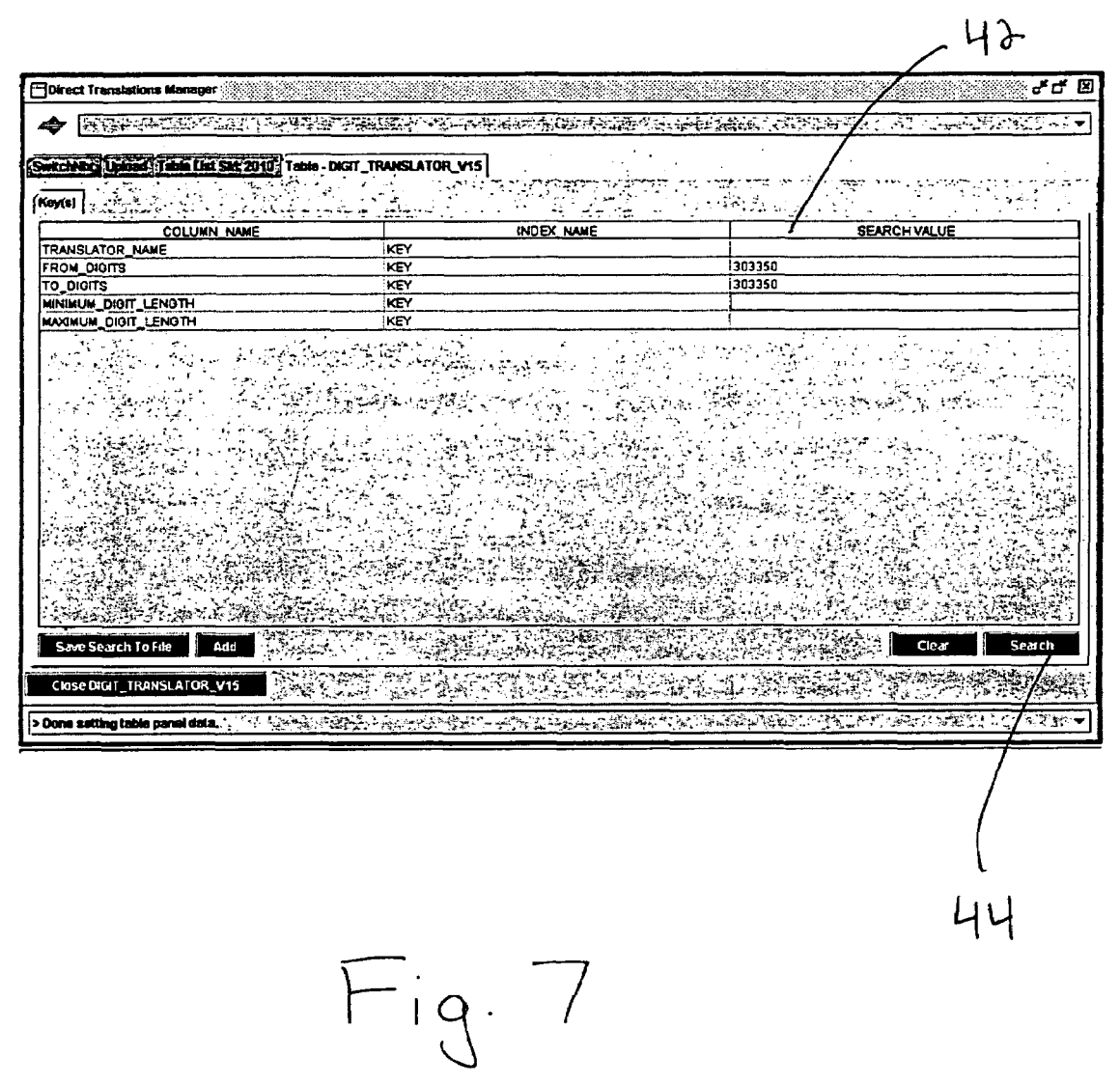
Figure 8:
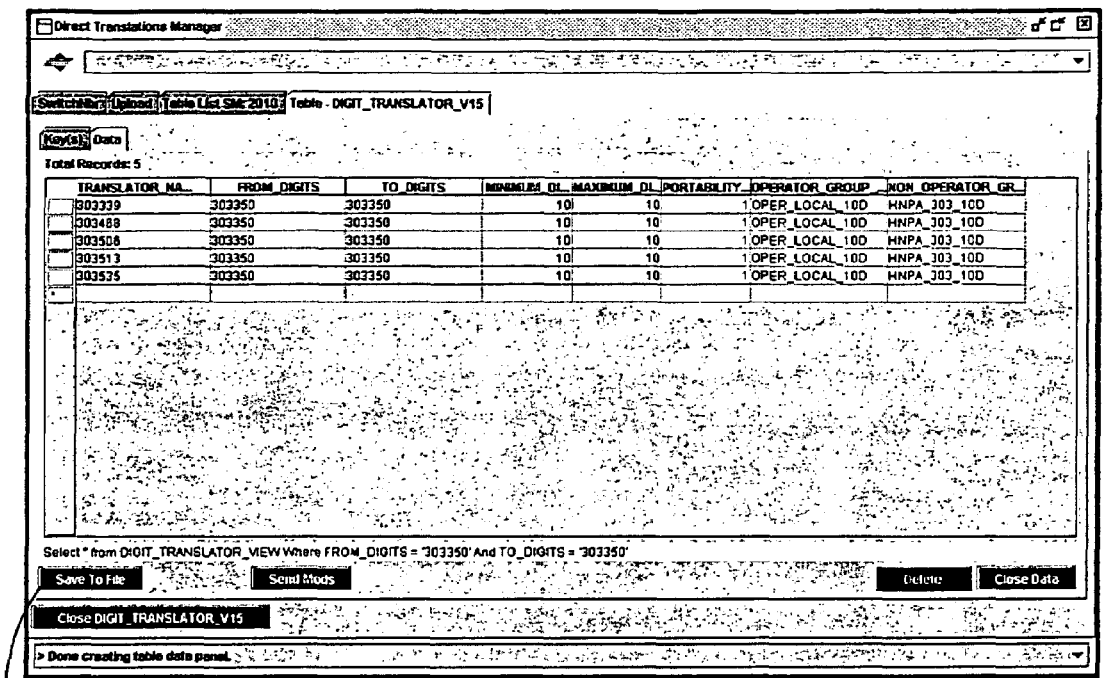
FIG. 8 is a screen shot of one of the screens presented by the computer program of the present invention.

To perform a search, the administrator may enter search criteria in the search value column 42 and then click on a Search button 44 in the lower right-hand corner of the screen as illustrated in FIG. 7. The applet then searches the data table based on the search criteria and returns the information from the switch in a screen such as the one illustrated in FIG. 8. The retrieved information is preferably displayed in a spreadsheet-type format on the screen of the user computer. The information may be sorted by clicking on the field name of each column. Information that is retrieved from the switch may be saved to a text file by clicking on a Save to File button 46 located on the screen. The applet then prompts the administrator to enter a location and file name in which to save the information. An entire table may also be saved to a text file.

Figure 9:
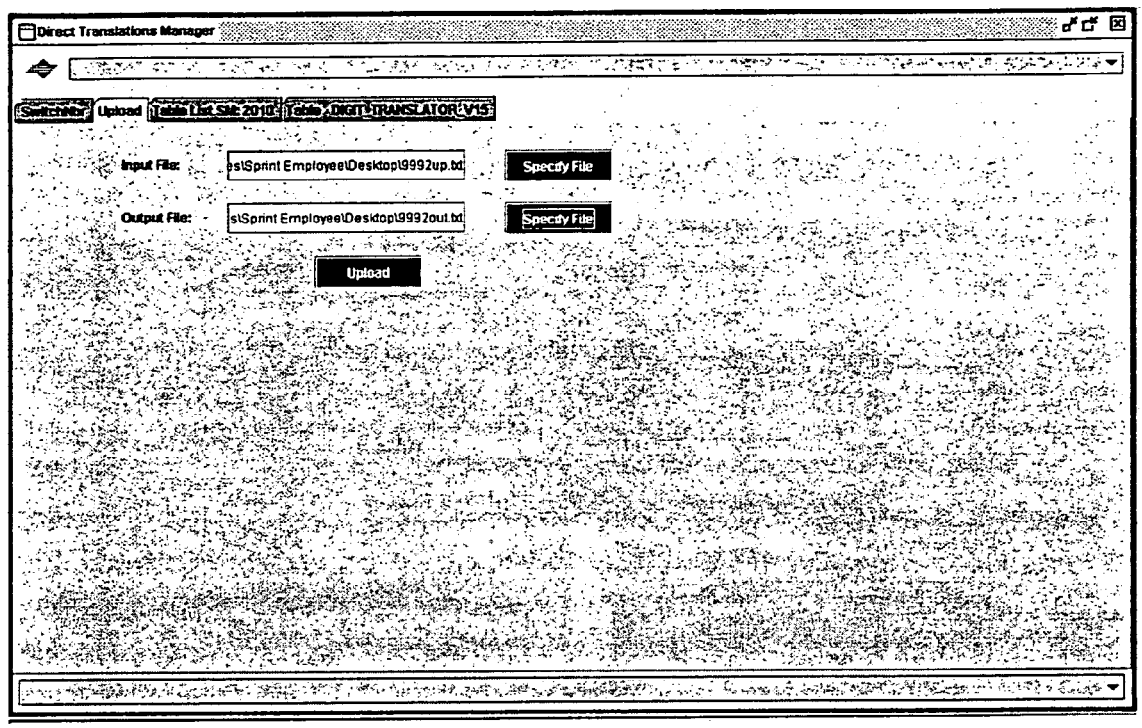
FIG. 9 is a screen shot of one of the screens presented by the computer program of the present invention.

Once information has been retrieved from the switch 10, the information may be supplemented, deleted, or otherwise modified as depicted in box 212. The data may be modified while the administrator is on-line with the server computer 16 or may be modified in a separate text file 20. Once the administrator has finished making changes to the data, the changes and/or the file may be uploaded to the switch as depicted in box 214 using an upload screen such as the one depicted in FIG. 9. The changes are preferably uploaded to the switch via the switch's IDL interface 14 or similar interface. The applet preferably does not write information directly to the Oracle tables 12, but rather presents the information to the switch's interface so that the changes may be uploaded directly to the Oracle tables by the operator of the switch.

The table wrapper code generator is used for mapping view elements. Particularly, any time a new table is added to a switch 10, it requires the creation of a view to interpret data and an interface to manipulate the view. The view structure and interface definition language (IDL) structure are passed to the table wrapper code generator, which then creates the code to map the view elements to the IDL elements. The code generator automates what is normally a manual process and therefore improves the accuracy and speed of table additions, particularly when multiple tables are modified.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A computer program stored on a computer-readable medium for directing a computer to act as an interface to a voice-over-i.p. local routing switch, the computer program comprising:
   a code segment generating an HTML page for permitting an administrator to select a voice-over-i.p. local routing switch;
   a code segment generating an HTML page for listing data tables from the voice-over-i.p. local routing switch using a remote object to obtain table addresses;
   a code segment for permitting the administrator to select one of the data tables;
   a code segment for retrieving information from the selected data table and for generating an HTML page displaying the information;
   a code segment for permitting the administrator to make changes to the retrieved information;
   a code segment for sending changes made to the retrieved information to an interface on the voice-over-i.p. local routing switch so that the changes may be incorporated in the data table; and
   a table wrapper code segment for creating a view and an interface to a data table on the voice-over-i.p. local routing switch.

2. The computer program as set forth in claim 1, wherein the retrieved information is presented in a plurality of logical tables.

3. The computer program as set forth in claim 2, wherein the administrator may make changes directly to one of the plurality of logical tables.

4. The computer program as set forth in claim 2, wherein the administrator may save a logical table from the logical tables to a file and perform changes to the file.

5. The computer program as set forth in claim 1, further including a code segment for permitting the administrator to search for information in the data table.

6. A method for modifying data tables contained in a voice-over-i.p. local routing switch, the method comprising the steps of:
- selecting a voice-over-i.p. local routing switch from a list thereof displayed on a computer via an HTML page generated by an applet running on a server;
- selecting a data table supported by the selected voice-over-i.p. local routing switch from a list thereof presented on the computer via an HTML page generated by the applet running on the server;
- retrieving the contents of the selected data table;
- searching for information in the retrieved contents of the selected data table by entering search criteria via an HTML page in the computer;
- modifying the information; and
- sending the modifications via the applet to an interface on the voice-over-i.p. local routing switch using the computer so that the modifications may be incorporated in the data table.

7. The method as set forth in claim 6, wherein the information is presented in a plurality of logical tables.

8. The method as set forth in claim 7, wherein the administrator may make changes directly to one of the plurality of logical tables.

9. The method as set forth in claim 6, wherein an administrator may save a logical table to a file and perform changes to the file.

10. A system for modifying data tables contained in a voice-over-i.p. local routing switch, the system comprising:
- a server computer; and
- a user computer;
- the server computer being programmed to include—
  - a code segment generating an HTML page for permitting an administrator to select a voice-over-i.p. local routing switch from a list thereof displayed on the user computer;
  - a code segment generating an HTML page for listing data tables from the voice-over-i.p. local routing switch using a remote object to obtain table addresses;
  - a code segment for permitting the administrator to select one of the data tables from a list thereof displayed on the user computer;
  - a code segment for retrieving information from the selected data table and for generating an HTML page displaying the information on the user computer;
  - a code segment for permitting the administrator to make changes to the retrieved information;
  - a code segment for sending changes made to the retrieved information to an interface on the voice-over-i.p. local routing switch so that the changes may be incorporated in the data table; and
- a table wrapper code segment for creating a view and an interface to a data table on the voice-over-i.p. local routing switch.

11. The system as set forth in claim 10, wherein the retrieved information is presented in a plurality of logical tables.

12. The system as set forth in claim 11, wherein the administrator may make changes directly to one of the plurality of logical tables.

13. The system as set forth in claim 10, wherein the administrator may save a logical table to a file and perform changes to the file.

14. The system as set forth in claim 10, the server computer being further programmed to include a code segment for permitting the administrator to search for information in the data table.

15. A computer program stored on a computer-readable medium for directing a computer to act as an interface for a telecommunications switch, the computer program comprising the steps of:
- a code segment operable to instruct a browser to open an applet;
- a code segment operable to permit the applet to retrieve a list of telecommunications switches;
- a code segment operable to permit the applet to generate an HTML page to display the list of telecommunications switches on a display;
- a code segment operable to permit a user to select a switch from the list of telecommunications switches;
- a code segment operable to generate a remote object to obtain table addresses from the selected switch;
- a table wrapper code segment for creating a view and an interface to a data table on the selected switch;
- a code segment operable to generate an HTML page to display a list of data tables that may be accessed from the selected switch;
- a code segment operable to access information contained in at least one data table listed in the selected switch;
- a code segment operable to generate an HTML page to permit the user to enter search criteria into the computer for searching the data table for desired information;
- a code segment operable to search the data table for the desired information based on the entered search criteria;
- a code segment operable to retrieve the desired information containing the entered search criteria for viewing by the user;
- a code segment operable to permit the user to modify the information in the data table; and
- a code segment operable to upload the modified data table to the switch.

16. The computer program as claimed in claim 15, further including a code segment for sorting the retrieved information.

17. The computer program as claimed in claim 16, wherein the modification of the information includes supplementing the information.

18. The computer program as claimed in claim 16, wherein the modification of the information includes deleting the information.

* * * * *